United States Patent [19]

Black

[11] Patent Number: 4,995,374

[45] Date of Patent: Feb. 26, 1991

[54] THROW AND FETCH DOGGIE TOY

[76] Inventor: William L. Black, 2800 N. State Rd. 7, Margate, Fla. 33063

[21] Appl. No.: 484,126

[22] Filed: Feb. 23, 1990

[51] Int. Cl.$^5$ .................... A01K 15/02; A63B 69/40
[52] U.S. Cl. ...................................... 124/54; 124/32; 119/29
[58] Field of Search ................ 124/1, 32, 54, 77, 82; 119/29; 273/26 D; D30/160; D21/210

[56] References Cited

U.S. PATENT DOCUMENTS

| | | | |
|---|---|---|---|
| D. 294,411 | 2/1988 | Merriman | D30/160 |
| 2,474,054 | 6/1949 | Jones | 124/32 X |
| 3,611,996 | 10/1971 | Wegner | 119/29 |
| 3,640,263 | 2/1972 | Rhodes | 124/32 X |
| 4,267,799 | 5/1981 | Bacon | 119/29 |
| 4,579,100 | 4/1986 | Whitaker | 124/32 X |
| 4,579,340 | 4/1986 | Jenkins et al. | 124/54 X |

Primary Examiner—Randolph A. Reese
Assistant Examiner—Jeffrey L. Thompson
Attorney, Agent, or Firm—Charles P. Padgett, Jr.

[57] ABSTRACT

A ball-launching system for a dog's ball which automatically launches or shoots a ball along an airborne path, thereby enabling the dog to chase the ball, fetch it and return it to the system. The system includes a ball collection area for receiving the returned ball, dropped or otherwise deposited therein by the dog, and for feeding the returned ball, under the force of gravity along, into the hollow interior of a ball-launching tube. As the ball rolls down the hollow interior of the tube, a sensing device detects the passage of the ball therover and generates a command signal. The command signal is delayed a predetermined period of time, sufficient to enable the ball to contact the rear end of the tube and come to rest in a firing position. A delayed signal is then used to energize a relay coil and operate a normally-open switching element disposed in a path between the source of electrical power and a solenoid coil for closing the relay-operated switches and energizing the solenoid coil to shift a piston-like solenoid rod from a cooked or withdrawn position to a forwardly-extended position in which the distal end of the rod extends through an aperture in the rear end of the tube and impacts a ball at rest in the firing position adjacent the closed end of the tube for firing or launching the ball up the hollow interior of the tube, out of the open mouth and on an airborne trajectory to again be chased, fetched and returned by a dog to begin the cycle anew.

66 Claims, 4 Drawing Sheets

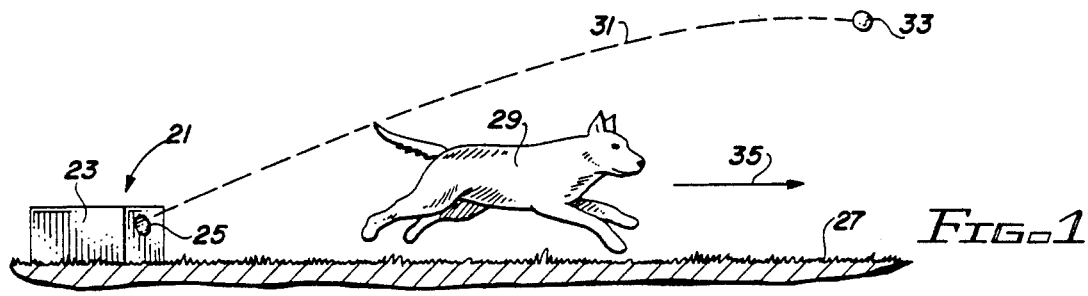
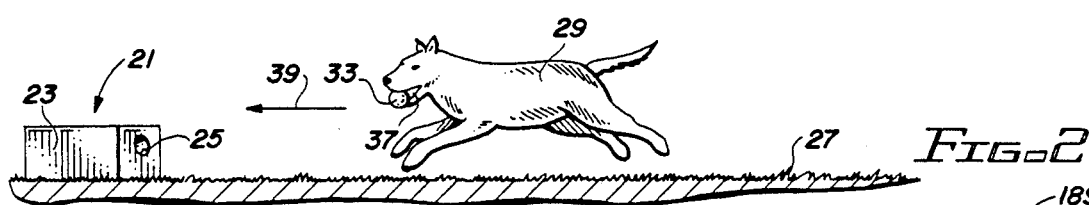
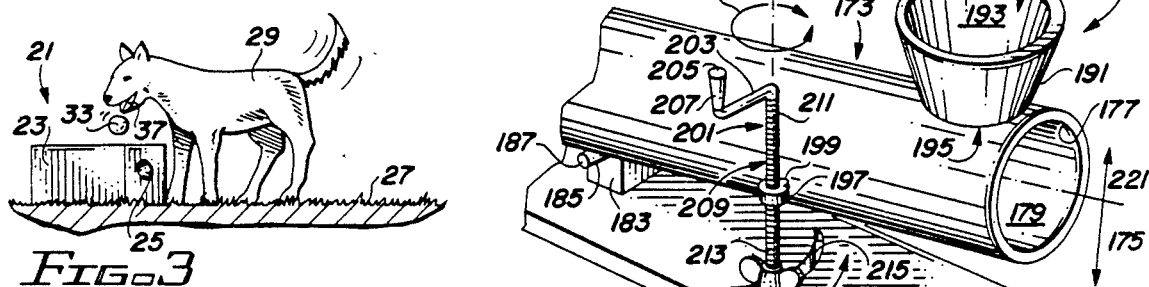
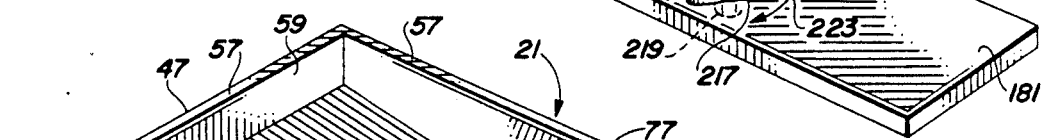
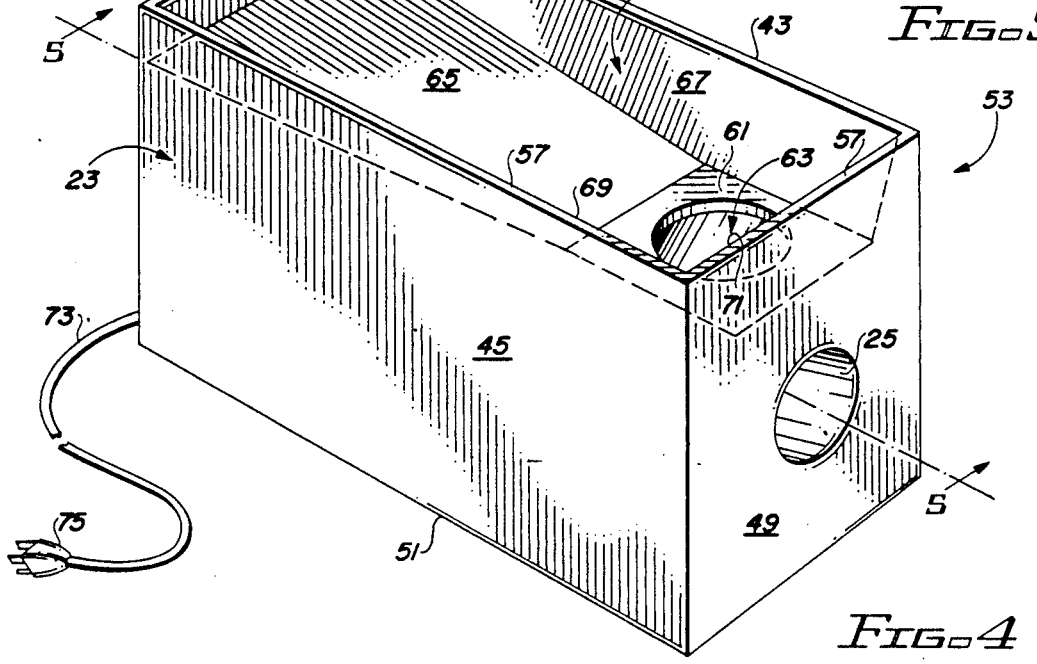

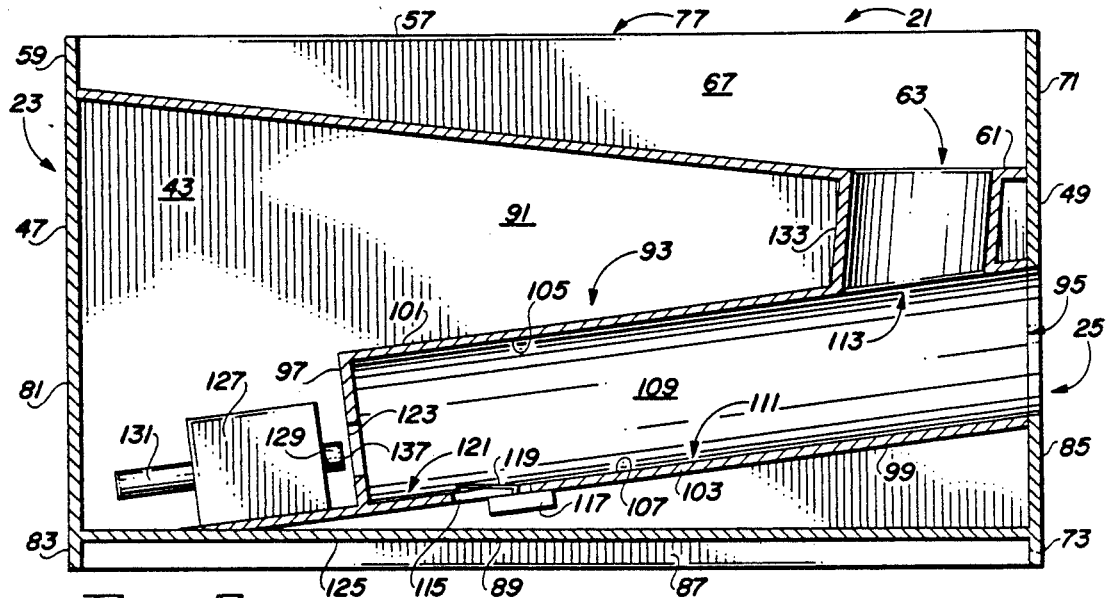
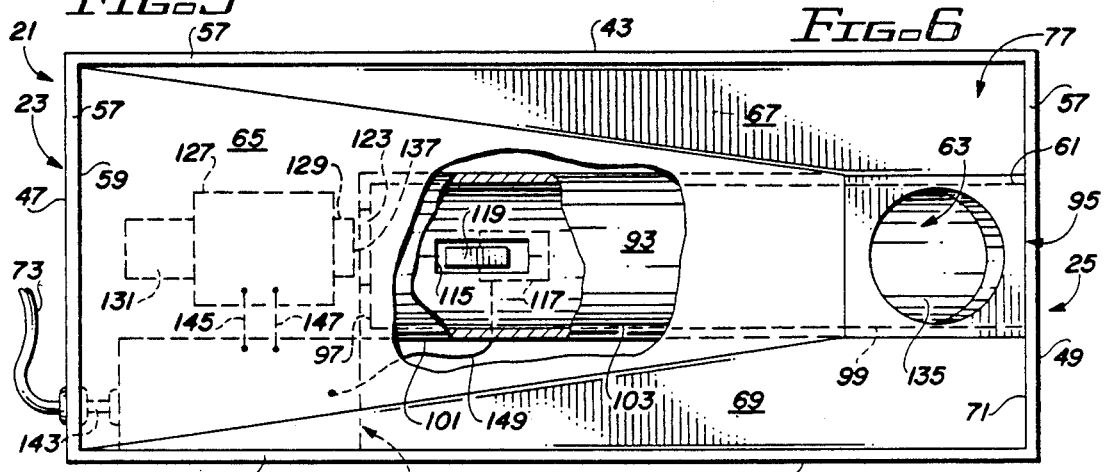
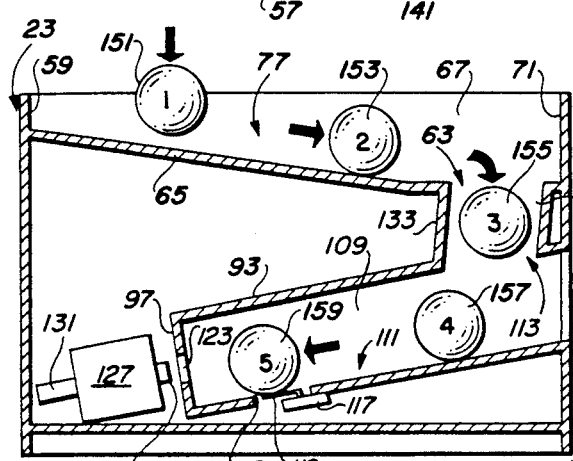
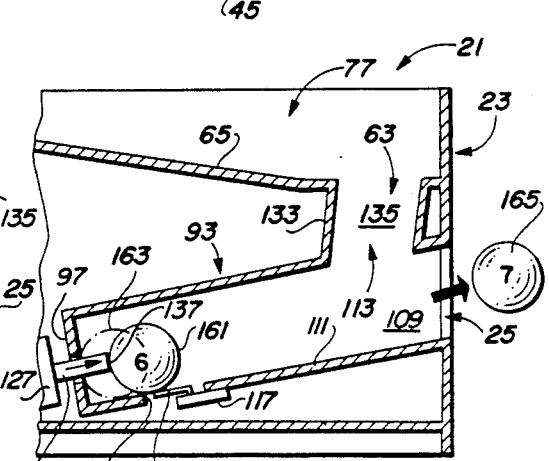

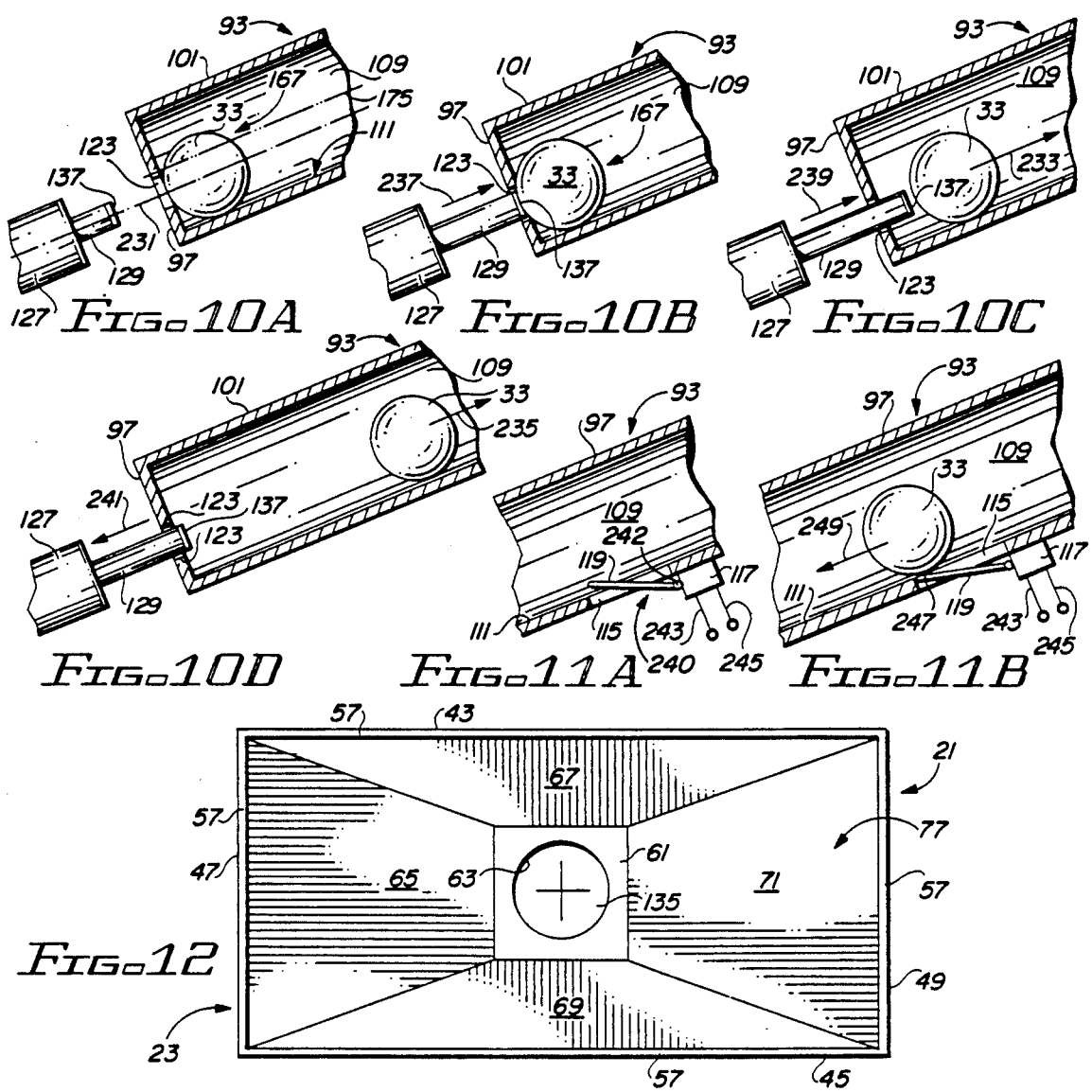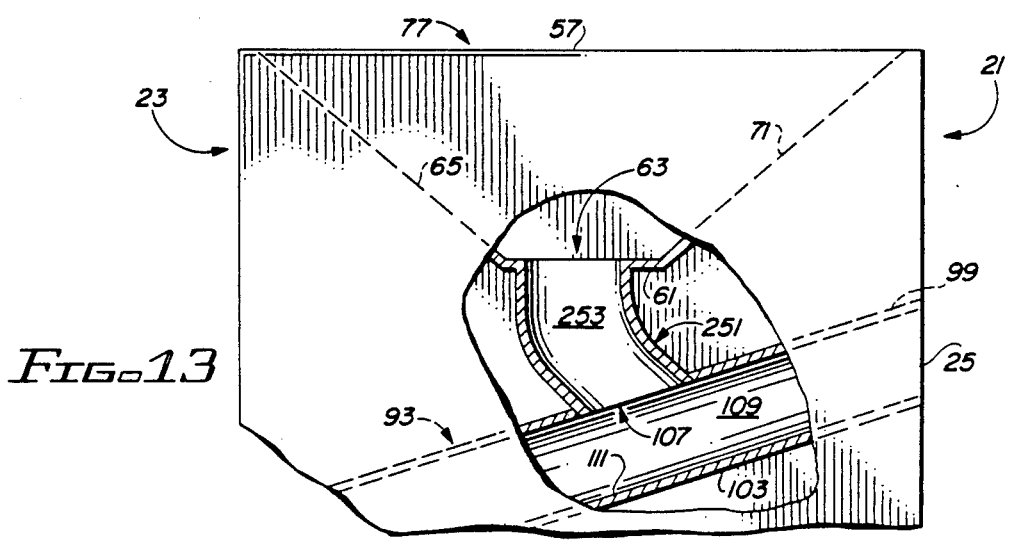

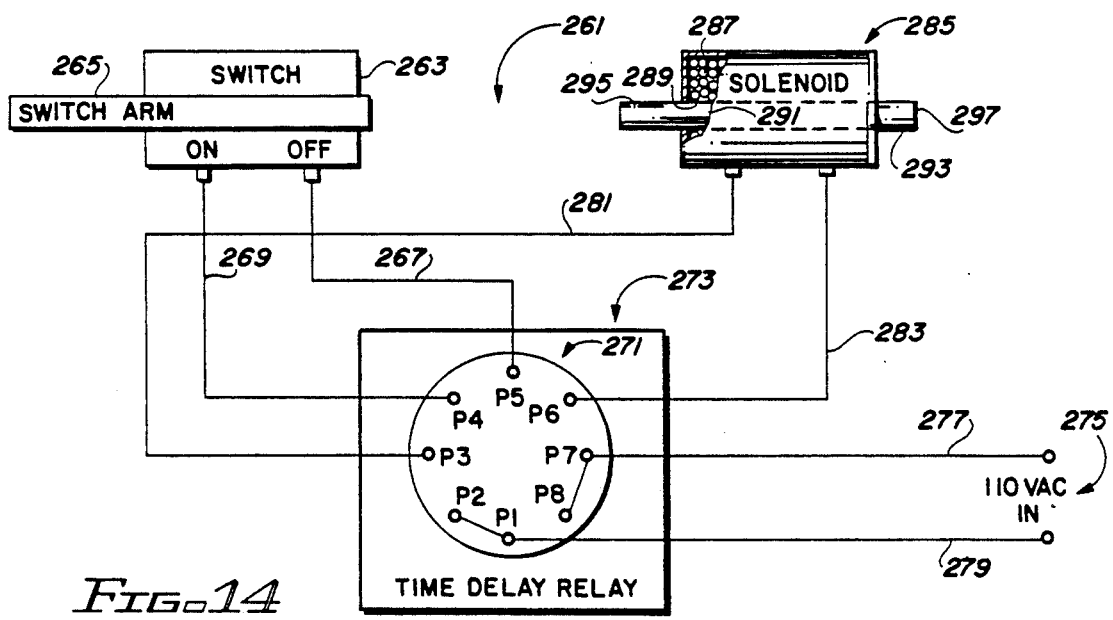
_Fig. 14_
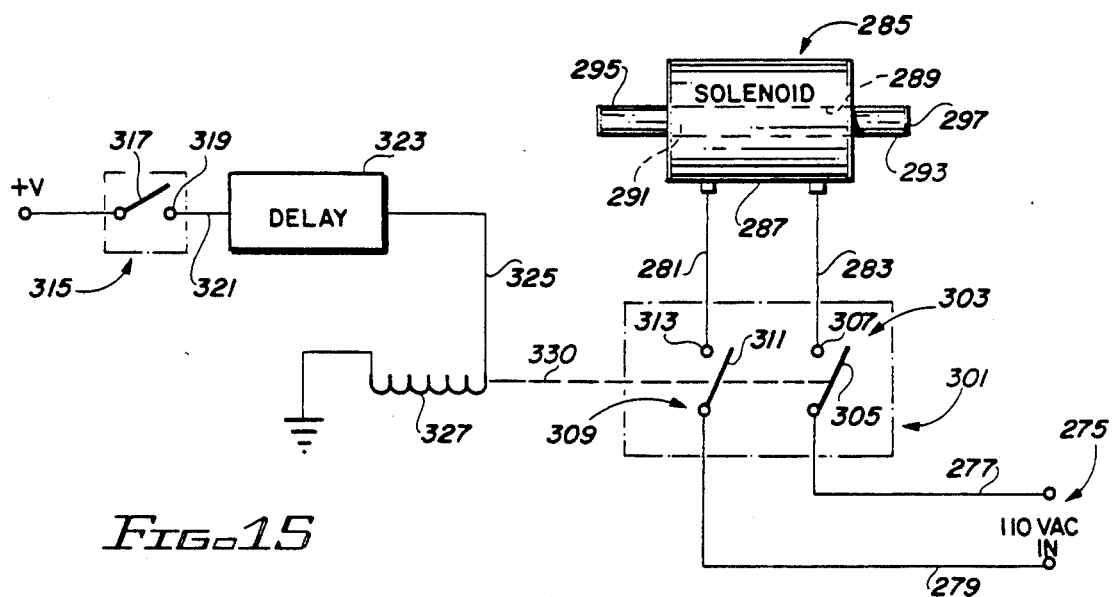
_Fig. 15_
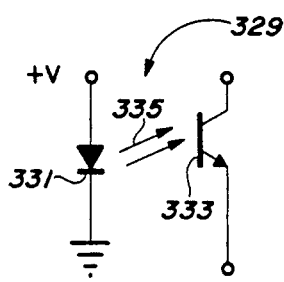
_Fig. 16_

THROW AND FETCH DOGGIE TOY

BACKGROUND OF THE INVENTION

1. Field of the Invention

This invention relates generally to ball-throwing apparatus, and more particularly to a throw and fetch system or apparatus for continuously and automatically throwing, launching, shooting, or tossing a ball which is then chased, fetched and returned to the apparatus by a dog or similar ball-fetching animal where it is deposited or collected when it is dropped by the dog to be launched again and again for as long as the dog continues to return it after each fetch.

2. Description of the Prior Art

Manually throwing a ball, or a similar object, for a ball-retrieving animal, such as a pet dog, in order that the dog can chase and fetch the ball, is an activity which is probably as old as the man-dog relationship. However, as any dog owner knows, at least some dogs never seem to get enough of this throw and fetch game, and the human owner usually wears out long before the dog is ready to call it enough for the day.

Furthermore, many pet owners suffer from arm ailments, lack of muscular strength, old age, and the like, and so they often cannot play throw and fetch with their pet dogs at all. Most dogs need this type of activity for exercise, as well as enjoyment, hence they are deprived when the owner cannot play the game or when the owner gives up far too soon to meet the animal's needs.

Various ball-throwing machines are present in the priort art, such as those shown in U.S. Pat. No. 1,897,317 which issued to H.R. McEachern in Feb. 1933 for a Ball Throwing Apparatus; U.S. Pat. No. 2,313,409 which issued to C.L. Walker on Mar. 9, 1943 for a Tennis Ball Trap; U.S. Pat. No. 3,807,379 which issued to Hien Vodinh on Apr. 30, 1974 for a "Spring-Type Ball Projecting Device With Programming Control Means"; U.S. Pat. No. 4,273,095 which issued to Richard Speer on June 16, 1971 for a "Pneumatically-Operated Ball Projecting Device"; U.S. Pat. No. 4,517,953 which issued to T. Osaka et. al. on May 21, 1985 for a "Ball Throwing Machine"; U.S. Pat. No. 4,579,100 which issued to Lawrence D. Whitaker on Apr. 1, 1986 for a "Ball Throwing Machine"; U.S. Pat. No. 4,579,340 which issued to Craig D. Jenkins et. al. on Apr. 1, 1986 for a "Basketball Return Device"; and U.S. Pat. No. 4,834,060 which issued to William J. Greene on May 30, 1989 for a "Hand-Carried Battery Powered Ball Throwing Apparatus".

However, all of the ball-throwing apparatus fo the prior art are extremely mechanically complex, difficult to maintain, and excessively costly, both to buy and to repair. Furthermore, none of the devices shown in these Patents are designed for a pet's benefit or use. Such mechanisms are used to throw tennis balls, baseballs, basketballs, etc., and most must be reloaded with a plurality or batch of balls at the end of a cycle before they can be used again. None uses a single ball which is thrown and which must then be retrieved and reloaded before it can be thrown again, since humans do not like to play fetch-type games.

therefore, a long felt and unfulfilled need has existed in the prior art and continues to exist today for a relatively mechanically simple, easy-to-maintain, easy-to-use, relatively low cost ball-throwing mechanism which the human owners can use to play throw and fetch with their ball-fetching aminals for as long as the animal wants to play and without tiring the human or even requiring that he or she be physically able to throw a ball at all.

The present invention solves substantially all of the needs of the prior art while avoiding any and all of its previous short-comings.

BRIEF SUMMARY OF THE INVENTION

It is an object of the present invention to provide a ball-throwing apparatus for enabling a ball-retrieving animal, such as a pet dog, to play throw and fetch.

It is another object of this invention to provide such a ball-throwing apparatus for enabling a dog to play throw and fetch relatively unassisted by a human being or owner.

It is still another object of this invention to provide such a ball-throwing apparatus for enabling a dog to play throw and fetch for as long a period of time as the dog desires, regardless of the physical capability of the pet's owner.

It is yet another object of the present invention to provide an automatic throw and fetch apparatus which throws, launches, shoots, or tosses a ball for a dog to chase, fetch and return, and which continues to do so for as long as the dog returns the ball to the apparatus after each fetch.

It is a further object of this invention to provide an automatic throw and fetch system for exercising a dog.

It is still a further object of this invention to provide an automatic throw and fetch system which operates substantially without human assistance, at least after the human initially loads the ball into the apparatus for the first launch.

It is yet a further object of this invention to provide a doggie toy which automatically exercises a dog.

It is also an object of this invention to provide a throw and fetch system for exercising a dog which can be used by human owners who could not otherwise play throw and fetch with their pet dogs because of physical limitations.

It is also another object of this invention to provide an automatic ball-throwing apparatus for pet animals, such as dogs, which includes a ball collection trough, area or surface upon which the dog drops or otherwise deposits the fetched and returned ball to enable the next throw.

It is yet another object of this invention to provide a substantially enclosed housing for a ball-throwing apparatus for playing throw and fetch with a ball-retrieving animal, such as a dog.

It is still another object of this invention to provide a throw and fetch apparatus for a dog which is relatively mechanically simple, easy-to-manufacture, easy-to-maintain and repair, easy-to-use, and which can be manufactured at a relatively low cost.

It is also another object of the present invention to provide an automatic ball-tossing apparatus for a dog which solves substantially all of the problems of the prior art in a non-complex, easy-to-maintain and use, low cost system.

The present invention provides a ball-launching, ball-throwing, ball-shooting, or ball-tossing apparatus for propelling a ball along an airborne trajectory or path of flight to be chased and fetched by a ball-retrieving animal, such as a pet dog or the like, repeatedly, for as long as the aminal continues to return the fetched ball to the apparatus after each successive chase.

The ball-launching apparatus of the preferred embodiment of the present invention includes an elongated, generally cylindrical, ball-launching tube having a hollow interior, an opening at the front end of the tube and a closure member at the rear end of the tube. Means are provided for positioning the tube for elevating the front opening above the level of the rear closure member in order that the ball may be launched on the airborne path or trajectory.

Means are also provided for collecting a returned ball and feeding it back into the hollow interior of the tube. Means are provided for detecting the presence of the ball at a predetermined position as it rolls down the hollow interior of the tube. Means are further provided which are responsive to the ball having come to rest adjacent the closed rear end of the tube for launching the ball through the hollow interior, out the front opening, and along the airborne path to once again be chased, fetched and returned by the ball-fetching animal.

Preferably, the ball-throwing apparatus of this invention includes a housing substantially completely enclosing the apparatus and wherein the top portion of the housing comprises a ball-collecting area, hopper or trough which catches the ball when it is dropped into the apparatus by the dog and directs the ball downwardly to be fed into the launch tube for a subsequent re-launch. The housing, and/or the launch tube, may be made from at least one of a transparent and translucent plastic material for enabling an observer to visually view or observe the operation of at least the launch tube porion of the apparatus.

In one embodiment, means are provided for manually adjusting the azimuth or elevation of the launch, the azimuth or direction of the launch, or both. Various types of ball-sensing mechanisms may be provided such as physical sensing members on electrical switches, electro-optical means, opetical means, and the like.

Preferably, an electrical solenoid having a hollow central core is provided with a reciprocally moveable longitudinal rod which is used as the launch or firing mechanism. The rod has a first predetermined position wherein the impact end is substantially drawn into the coil of the solenoid and a second predetermined position wherein the rod is extended longitudinally to impact and fire the ball once the solenoid is energized. The energization of the solenoid is controlled by electrical delay means and a signal from the sensing means so as to ensure that the ball has reached or settled in a position at the downward end of the launch tube and is still or motionless prior to impact.

These and other objects and advantages of the present invention will become more fully understood after reading the detailed description of the preferred embodiments of the present invention, the claims, and the brief description of the drawings, which are briefly discussed hereinbelow.

BRIEF DESCRIPTION OF THE DRAWINGS

FIG. 1 is a perspective view of the automatic ball-launching apparatus of the present invention as it is seen throwing a ball to be chased, fetched and returned by a dog;

FIG. 2 is a perspective view of the atuomatic ball-launching apparatus of FIG. 1 as the dog is returning the fetched ball to the ball-launching apparatus;

FIG. 3 is a perspective view of the automatic ball-launching apparatus of FIGS. 1 and 2 showing the dog dropping or otherwise depositing the returned ball for feeding same back to the apparatus to be launched again;

FIG. 4 is a perspective view of the ball-launching apparatus of the preferred embodiment of the present invention;

FIG. 5 is a sectional side view of the ball-launching apparatus of FIG. 4 taken along view lines 5—5 thereof;

FIG. 6 is a top plan view, partially cut away, of the ball-launching apparatus of FIGS. 4 and 5;

FIG. 7 is a schematic side view of the ball-launching apparatus of the present invention used for illustrating the ball-loading steps of the system;

FIG. 8 is a schematic side view of the ball-launching apparatus of the present invention illustrating the ball-firing steps of the system;

FIG. 9 is a perspective view of an alternate embodiment of the ball-throwing apparatus of the present invention;

FIG. 10A is a sectional side view of the rear end poriton of the launch tube and the firing mechanism of the apparatus of FIGS. 4, 5 and 6 wherein the ball is in the "ready" or "firing" position;

FIG. 10B is a sectional side view, as in FIG. 10A, shwoing the moment of impact of the firing mechanism with the properly positioned ball;

FIG. 10C is a sectional side view, as seen in FIGS. 10A and 10B, showing the final position of the firing mechanism and the ball as it is initially propelled up the launch tube;

FIG. 10D is a sectional side view, as in FIGS. 10A, 10B and 10C, illustrating the firing mechanism having returned to its initial position and the impacted ball proceeding upwardly in the tube for launch;

FIG. 11A is a sectional side view of a portion of the launch tube illustrating the preferred embodiment of the ball-sensing apparatus of the system of the present invention in a first "no ball sensed" position;

FIG. 11B is a sectional side view of a portion of the launch tube illustrating the ball in a second "ball sensed" position;

FIG. 12 is a top plan view of an alternate embodiment of the ball-collection means of the housing or enclosure of the ball-launching apparatus of FIG. 4;

FIG. 13 is side view, partially in section, of the apparatus of FIG. 12 illustrating a modified ball-feeding system of the ball-launching apparatus of FIG. 4;

FIG. 14 is an electrical schematic diagram of the control system of the ball-launching apparatus of the present invention;

FIG. 15 is a more detailed electrical schematic diagram of the circuitry of FIG. 14; and FIG. 16 is a schematical representation of an alternate ball-sensing system for the ball-launching apparatus of the present invention.

DETAILED DESCRIPTION OF THE PREFERRED EMBODIMENTS

FIG. 1 shows the ball-launching apparatus 21 as including a housing, enclosure, or case 23 having a front launch aperture 25 therein. A ball-fetching aminal, or dog 29, is shown as chasing the ball 33 which has been launched from the launch aperture 25 of the apparatus 21 on an airborne trajectory or path of flight 31. The dog is going in the fetch direction, as indicated by the directional arrow 35, and both the housing 23 of the ball launching apparatus 21 and the dog 29 are positioned or running on the surface 27, respectively.

FIG. 2 illustrates the dog 29 running in the return direction, as indicated by the directional arrow 39, and carrying the fetched ball 33 within its mouth or jaws 37 for returning the ball 33 to the ball-launching apparatus 21.

FIG. 3 shows the dog 29 having returned the ball 33 to the apparatus 21 and dropping or otherwise depositing the ball 33 onto the top collection surface or trough area of the enclosure 23, as hereinafter described.

FIG. 4 shows the ball-launching apparatus 21 of the present invention as preferably including a housing 23 which includes an elongated, rectangular, right side panel 43, an elongated, rectangular, left side panel 45, a rectangular rear panel 47, a rectangular front panel 49, which contains or includes the launch aperture 25, a generally rectangular bottom portion 51 and a generally rectangular ball-collecting top portion 53.

The plane of the right side panel 43 is generally parallel to the plane of the left side panel 45, and the right side panel 43 and left side panel 45 are similarly dimensioned. The plane of the rectangular rear panel 47 is generally parallel to the plane of the generally rectangular front panel 49, and the rear panel 47 and front panel 49 are similarly dimensioned to one another. The planes of the rear panel 47 and the front panel 49 are perpendicular to the planes of the right side panel 43 and left side panel 45 to form an enclosed four-sided box-like housing 23. A generally rectangular bottom portion 21 generally includes a rectangular panel whose plane is perpendicular to the planes of the right side panel 43, left side panel 45, rectangular rear panel 47 and rectangular front panel 49 to close off the bottom of the box-like housing 23 and form a hollow, open-top housing 23.

The rectangular ball-collecting top portion 53 is bounded by the top distal rim portions 57 of the side panels 43 and 45 and the rear and front panels 47 and 49, respectively. The plane of the top rim portions 57 is generally parallel to the plane of the bottom portion 51 and perpendicular to the planes of the side panels 43 and 45 and the planes of the rear panel and front panel 47 and 49, respectively.

The ball-collecting open-top portion 53 includes the top distal rim portions 57 which are disposed at the upper distal ends of the rear panel 47, front panel 49, right side panel 43, and the left side panel 45. The vertically extending portions terminating in the rim portions 57 include the substantially vertical end portion 59 of the rear panel 47; the outwardly sloping surface (or vertical surface) 60 adjacent the front panel 49; the downwardly sloping interior surface 67 of the right side panel 43, and the downwardly sloping surface 69 of the interior of the left side panel 45. A generally rectangular or square surface area or panel 61 is positioned adjacent the front panel 49 and spaced a predetermined distance rearwardly thereof.

A generally rectangular ramp or btoom portion 65 has its opposite longitudinal sides coterminous with the rectangular sides 67 and 69, respectively, its rear end coterminous with the vertical rear portion 59 and its front end coterminous with the rear edge of a substantially rectangular or square base plate 61. The front end of the base plate 61 is coterminous with the front portion 71 and the opposite sides are coterminous with the sides 67 and 69, respectively. The rear end of the ramp 65 is elevated vertically with respect to the front edge abutting the base plate 61 to provide a downwardly and forwardly sloping ramp 65 for supplying all balls deposited into the collection hopper 77 to roll onto the base plate 61 and into the aperture 63.

The surface portion or lower plate 61 includes a central circular aperture comprising a ball-feeding or ball-supplying aperture 63 centrally disposed in the center thereof. The plane of the lower surface plate 61 is generally parallel to the planes of the top rim portion 57 and the bottom portion 51 and perpendicular to the planes of the side panels 43 and 45 and the rear and front panels 47 and 49, respectively. All of the remaining surfaces (65, 67, 69) surrounding the plate 61 slope downwardly and inwardly from the upper or top rim portions 57 so as to guide any ball dropped or otherwise deposited into or onto the ball-collecting top portion 53 of the housing 23 downwardly and inwardly toward the aperture 63 in the center of the lower plate 61.

The diameter of the circular aperture 63 is greater than the diameter of the ball 33 and the size of the panel 61 is such that the ball is unable to position itself at rest at any portion of the top surface thereof since once it reaches the flat upper surface of the plate 61, its center of gravity will be positioned over the edge of the aperture 63 causing it to fall therethrough from whence it is then supplied to the hollow interior of the launch tube of the apparatus 21 of FIG. 4, as hereinafter described.

A bottom ramp portion 65 has its upper end or base integral with or connected to the vertical rear end portion 59 and its opposite forward end integral with or connected to the rear edge of the flat plate 61 such that the forward end of the bottom or ramp 65 is connected to the rear end of the plate 61 is positioned substantially vertically lower than the rear edge contiguous with the vertical portion 59 of the rear panel 47 terminating in the upper distal edge portion 57, so that any ball rolling onto the downwardly-sloping ramp or surface 65 must roll, under the force of gravity alone, onto the surface of the square plate 61 to drop through the aperture 63. Similarly, any ball landing on the downwardly-sloped side portions 67 and 69 will be directed either toward the ramp 65 or toward the flat plate 61, by the force of gravity alone, so as to enable the ball to drop through the aperture 63. Lastly, any ball deposited on the front sloping surface 71 will roll down and drop onto the flat plate 61 and fall through the supply aperture 63 as hereinafter described.

FIG. 4 also shows an electrical power cord 73 having one end terminating in a conventional three-prong electrical plug for use in a conventional 110V AC outlet, and the interior collection area 77 of the top portion 53 is indicated as existing between and being bounded by the upper distal rim portions 57, the vertical upper rear panel portion 59 of the rear panel 47, the downwardly sloping surfaces 67 of the right side panel 43, the downwardly and inwardly sloping surface 69 of the left side panel 45, and the downwardly and inwardly sloping front surface 71 of the front panel 49.

FIG. 5 is a sectional side view of the ball-throwing apparatus 21 of FIG. 4 taken along view lines 5—5 thereof to show the interior of the ball-throwing apparatus 21. In FIG. 5, the bottom portion 51 is shown as including a lower or bottom portion 81 of the rear panel 47 while the front panel 49 includes a lower or bottom end portion 85. A generally rectangular bottom panel 89 has its plane generally parallel to the plane of the top distal rim portions 57 and the base plate 61 and perpendicular to the planes of the side panels 43 and 45, the rear panel 47, and the front panel 49 and provides a support or base on which the remainder of the apparatus is positioned as hereinafter described.

Vertically, downwardly-extending, distal end portions 83 of the lower end portion 81 of the rear panel 47 and the lower end portion 85 of the front panel 49, as well as the lower end portions of the side panels 43 and 45, form a hollow or recess 87 beneath the horizontal bottom panel 89. As seen in FIG. 5, the box-like housing 23 of the ball-throwing apparatus 21 of the preferred embodiment of the present invention includes a substantially hollow interior 91 into which is positioned a generally right circular cylinder, barrel or launch tube 93. The launch tube 93 includes an open mouth 95 at its front end and a rear closure member 97 at its rear end. The tube 93 includes an upper or raised front end portion 99, a lower or rear end poriton 101, and an intermediate cylindrical portion 103 integrally existing therebetween. The launch tube 93 includes an upper longitudinal barrel wall or sleeve 105 and a corresponding lower longitudinal barrel wall or sleeve 107, both of which extend substantially the entire length of the tube 93. The tube 93 includes a hollow cylindrical barrel or tube interior 109 and contains an arcuately curved interior ball track 111 on the interior inner surface of the lower barrel wall or sleeve portion 107.

Furthermore, the launch tube 93 includes a ball-loading aperture or port 113 through the upper longitudinal wall or sleeve portion 105 in the upper or raised front end portion 99 thereof. In addition, a sensing aperture 115 is provided in the lower longitudinal barrel wall 107 of either the intermediate portion 103 or the rear end portion 101 of the longitudinal tube 93.

In the preferred embodiment of FIG. 5, an electrical switch 117 is mounted on the exterior surface of the lower barrel wall 107 and the switch 117 includes a moveable, extending contact arm or member 119. The arm 119 is normally-biased to a first position, as shown in FIG. 5, where it extends at least partially through the sensing aperture 115 and into the ball path or track 111 so that any ball 33 rolling down the track 111 will contact the switch trigger arm 119 and turn the switch from its normally "off" position to its "on" position, as hereinafter described.

Lastly, the tube 93 includes a lower rear end portion 101 which terminates in a closure member 97 having a thrust or firing aperture 123 therethrough. A "ball ready" or "firing" position 121 exists on the track 111 between the sensing aperture 115 and the rear closure member 97, as hereinafter described. The lower arcuate sleeve portion 107 may be disposed on a ramp or support member 125 for positioning the tube 93.

The system 21 further includes an electrical solenoid 127 which includes a longitudinally positionable thrust rod having a first thrust end portion 129 and a second opposite end portion 131. The longitudinal axis of the thrust rod comprising the end portions 129 and 131 is aligned with the center of the aperture 123 and with the center of gravity of the ball 33 when the ball 33 is in the "ready" position 121, as hereinafter described, so that when the impact end portion 129 moves forwardly, the contact surface 137 at the distal end of the thrust rod portion 129 strikes the ball at its approximate center of gravity and launches it up the hollow interior 109 of the tube 93.

The ball-feeding or ball-supplying aperture 63 of the top collection protion 77 of the housing 23 is conencted to the ball-loading aperture or port 113 of the tube 93 via a ball-conducting passage or conduit 133 having a substantially hollow circular cylindrical interior 135 adapted to freely pass the ball from the collection area or plate 61 of the upper or top collection portion 77 and allow the ball to drop through the feed aperture 63, pass through the hollow interior 135 of the ball-transmitting conduit 133 and then drop through the ball-loading aperture or port 113 into the hollow interior 109 of the launch tube 93. After bouncing for some predetermined period of time, the ball rolls smoothly downward along the track 111 toward the ready positon 121.

FIG. 6 is a top plan view of the ball-throwing apparatus 21 of FIGS. 4 and 5. FIG. 6 illustrates a control circuitry or relay/delay circuitry box 141 having a power in conenctor 143 connected to the electrical power cord 73 of FIG. 4. Additionally, electrical lead 145 connects the control circuitry 141 to the input of the solenoid 127 while the solenoid output is connected via lead 147 back to the control circuitry of box 141. Lastly, an electrical lead 149 connects the electrical switch 117 of the sensing means of the present invention back to an input of the control circuitry box 141.

FIG. 7 illustrates the loading process of the ball-throwing apparatus or system 21 of the present invention. In FIG. 7, the ball 33 is represented in its various positions which are numbered within the interior of the ball 33, as hereinafter described. The first ball position (ball 1) is indicated by ball 151 as it is dropping downwardly into the collection area 77 of the top portion 53 of the housing 23 by the dog 29, as shown in FIG. 3. The heavy black directional arrow shows that the ball 151 is being dropped vertically downward into the colelction area 77. As the ball 151 contacts the ramp or downwardly sloping surface 65, it gradually stops bouncing and rolls smoothly, as shown by the ball in position 2 as represented by ball 153. Finally, the ball comes to rest on the plate 61 adjacent the aperture 63 and, by the force of gravity alone, falls downwardly through the hollow interior 135 of the ball-conducting or transporting passge 133 as indicated by the third ball represented by reference numeral 155. In the position of ball 155, the ball is now within the hollow interior 135 of the conduit 133 between the upper feed aperture 63 and the lower ball-loading aperture 113. In the fourth position, ball 4 is shown as having contacted the track 111 and bounced until it settles into a smooth downwardly rolling motion, as represented by the fourth position of the ball represented by reference numeral 157. Lastly, in the fifth position , the ball indicated by reference numeral 159 is shown as having rolled downwardly along the track 111 toward the closure member 97 and is presently passing over the sensing aperture 115 so as to move the sensing arm 119 of the switch 117 downwardly to change the state of the switch 117 from its normally "off" state to its "on" state and generate a trigger or control signal for controlling the firing of the ball, as hereinafter described. The ball in the fifth position or sensing position is represented by reference numeral 159, and it is still rolling in the direction shown by the heavy dark arrow toward the closure member 97 at the end of the launch tube 93.

In FIG. 8, the ball 161 is shown as it begins to pass off of the switch member 119 along the track 111 as it continues to roll smoothly downward from position 6, as indicated by reference numeral 161, toward the interior surface of the closure member 97. When it reaches this position and stops bouncing off of the closure member 97, the ball comes to rest in the "ready" or "firing" position 121 represented by the positioned ball 163 (in dashed lines) of FIG. 8. At this point, the solenoid 127 fires causing the thrust member 129 to move longitudinally forward causing the contact surface 137 to strike the positioned ball 163 at its center of gravity and start the ball rolling upward in the hollow interior 109 of the tube 93, as indicated by position 6 of ball 161 of FIG. 8. The ball continues to be propelled up the hollow interior 109 of the tube 93 until it exists the launching port 25 at its initial firing velocity along its path of flight or airborne trajectory, as shown in FIG. 1. The ball in the just-launched position is represented in position 7 by reference numeral 165.

FIG. 9 discloses an alternate embodiment of the ball-throwing apparatus of the present invention and is designated by reference numeral 171. The apparatus 171 includes a generally cylindrical barrel or tube 173 having a longitudinal axis 175 taken through the hollow interior 179 thereof. The tube 173 includes an open mouth or launch aperture 177 at one end and a closure member, not shown, but similar to that previously described, at the opposite end. The apparatus 171 is provided with a generally rectangular base 181. A generally rectangular block 183 is mounted on the top surface of the base 181 for connection to the launch tube 173 via a conventional hinge mechanism, only the hinge portion 185 and the hinge pin 187 being shown. A ball-collection aperture 189 is provided atop a downwardly and inwardly disposed funnel-like side 191 to provide a hollow ball passage 193 therethrough to the feed aperture 195 disposed at the opposite end thereof immediately adjacent to and/or corresponding to the ball-feeding aperture or supply aperture 113 of the previously described launch tube 93 of FIG. 5.

An internally-threaded, nut-like member 197 is secured to the side of the tube 173 by attachment means such as welding, solder, adhesives, and the like 199, and a double L-shaped member 201 is treaded therethrough. The double L-shaped member 201 includes a horizontally disposed arm portion 203 having one end terminating in a vertically upwardly disposed leg 205 provided with a rotatable handle or knob 207 mounted thereon for operating or turning the L-shaped member, as hereinafter described. The opposite end of the horizontal arm 203 is integral with a vertically downwardly-extending, externally-threaded lower leg 209 having a mid portion 211 and a lower end portion 213. The mid portion 211 is threaded through the interiorly-threaded aperture of the nut-like member 197 while the lower end portion 213 extends vertically therebelow to pass through an arcuately curved arc or slot 215 in the base 181. The lower end portion 213 has a wingnut 217 secured thereto adjacent the upper side of the support 181 and a conventional, recessed, nut-like member 219 secured to the opposite or bottoms ide of the base 181.

Therefore, it can be seen that the apparatus 171 can have its azimuth or horizontal direction varied by loosening the wingnut 217 and sliding the lower end portion 213 of the externally-threaded leg portion 209 back and forth in the arcuate slot or arc-like slot 215. When it is in a desired position, the wingnut 217 can be tightened so as to clamp the base 181 between the base of the wingnut 217 and the recessed lower nut 219. Furthermore, by turning the crank handle 207, as indicated by the bi-directional arrow 225 about the longitudinal axis 227 of the elongated lower leg 209, the front end of the tube can be raised or lowered so as to control the elevation, trajectory or angle of launch, as desired. This will vary the heighth of the ball when it is thrown and the distance that it goes, and it can be adjusted to suit the particular pet then chasing and fetching the ball. The bi-directional arrow 223 indicates the azimuth directions in which the apparatus may be positioned while the bi-directional arrow 221 illustrates the elevation control direction.

FIG. 9, the pet 29 retrieving the chased and fetched ball, returns to the apparatus 171 and drops or otherwise deposits the ball into the funnel-like collection aperture or opening 189 where it then passes through the interior 193 of the funnel-like conduit 191 and then through the lower feed aperture 195 into the hollow interior 179 of the launch tube 173 from whence it rolls rearwardly and downwardly over a sensing means and into a firing position, as previously described with reference to the preferred embodiment of FIG. 4. Similaly, the apparatus 171 of FIG. 9 can have the launch tube 173 and the funnel-like collection funnel 191 made of some transparent or translucent plastic material to enable an observer to see the entire operation of the apparatus.

However, in both the embodiment of FIG. 4 and the embodiment of FIG. 9, the general construction is similar except for the housing 23 of the preferred embodiment and the difference between the funnel-like portion 191 of the alternate embodiment and the top or upper collection area 77 of the preferred embodiment. The preferred embodiment offers a much larger area into or onto which the dog can drop the fetched and returned ball and still have the launch tube loaded for the next shot. The dog would require more dropping accuracy to ensure that each dropped ball was returned to the launch tube of the alternate embodiment of FIG. 9, via the top collection aperture 189.

In both embodiments, the construction material of the housing of the preferred embodiment and the base of the alternate embodiment could be any suitable construction material such as wood, metal, plastic, or the like. The launch tubes would preferably be made from a plastic material, although other suitable construction materials including light-weight metal and the like could also be used. It will also be understood that various mechanisms may be used for controlling either the azimuth or the elevation of the shot or both, as known in the art.

In FIG. 4, the launch aperture 25 is shown as being located on the central longitudinal axis of the barrel 93 and it would be disposed vertically upwardly of the horizontal center line thereof in normal operation or it could be slightly larger or even oval-shaped, if desired. The circular diameter of the aperture 25 is used in the preferred embodiment to correspond to the internal diameter of the launch tube to more closely limit the launch path which the ball takes upwardly through the hollow interior of the tube and thus the airborne trajectory of the launched ball thereafter. As used in this Patent Application, the terms ball-throwing, ball-launching, ball-shooting and ball-tossing apparatus are used interchangeably. The act of the dog chasing the ball is generally meant to include that portion of the cycle from the launch of the ball until the ball is either caught in the air by the dog or the dog catches the ball rolling along the ground or stopped. The return cycle involves the dog clasping or fetching the ball by grasping it between its jaws and returning to stand by the apparatus for dropping the ball therein. The dropping of the ball into the collection area or aperture then completes the dog's role until the ball falls through the feed aperture and is again launched on its airborne trajectory to start the chase and fetch cycle again.

FIG. 10A illustrates the position of the ball 33 in the "ready" or "firing" position 167 within the hollow interior 109 of the launch tube 93 immediately adjacent to and abutting the interior surface of the closure member 97 such that the center of gravity of the ball is aligned with the longitudinal axis 231 of the solenoid rod 129. It will be noted that the center axis of the tube 93 which is represented by reference numeral 175 is displaced upwardly from the impact axis 231 and is parallel thereto but not correspondent thereto. This is because, in the preferred embodiment of the present invention, the inner diameter of the launch tube 93 is much greater than the diameter of the ball so as to avoid or at least minimize contact with the ball once it is actually launched, which would otherwise decrease its initial velocity. The center of the firing aperture 123 is also aligned with the launch axis or impact axis 231, and it will be seen that the contact surface 137 of the solenoid rod portion 129 is aligned directly with the aperture 123 and in a rearward or "cocked" position ready to fire.

FIG. 10B shows the rod portion 129 extended into the aperture 123 so that the impact surface 137 meets the surface of the ball 133 along its center of gravity for firing or launching same. This is the initial contact or launch position and an intermediate point on the longitudinal forward extension of the rod 129 by the solenoid 127 once it is energized. The direction of motion of the rod portion 129 is shown by the directional arrow 237.

FIG. 10C illustrates the position of the ball 33 in the hollow interior 109 of the launch tube 93 after it has impacted the impact surface 137 of the rod 129 and begun its path of treavel up the tube 93, as indicated by the directional arrow 233. The solenoid rod portion 129 is moving to its maximum forward point as indicated by directional arrow 239, through the firing aperture 123 and after this point, the impact surface 137 never again contacts the ball 33.

FIG. 10D shows the rod portion 129 moving in the opposite direction, as indicated by the directional arrow 241, to retract itself back into the hollow interior or core of the solenoid 127 until it reaches the "cocked" or "ready" position shown in FIG. 10A. Meanwhile, the ball continues its upward movement within the hollow interior 109 of the launch tube 93, as indicated by the directional arrow 235, and it will so continue its movement until it passes through the launch aperture 25 and settles on its airborne trajectory or line of flight, as previously described.

In summary, FIGS. 10A–10D illustrate the firing operation of the launch system of the present invention, and the thrust member 129 is shown as having a longitudinal axis 231 which passes through a central portion of the aperture 123 and extends through the cneter of gravity of the ball 33 when the ball 33 is in the "firing" position 167. The directional arrow 237 shows the initial direction of motion of the thrust rod or member 129 and the impact member 137 at the distal end of the rod 129 just as it contacts or initially strikes the outer surface of the ball 33. Arrow 239 shows the continued forward motion of the thrust rod 129 even after the ball has cleared the impact surface and proceeds on its journey, as indicated by directional arrow 233. Arrow 241 shows the rod 129 as it is pulled back or retracted into the hollow interior or core of the solenoid 127 until it again reches the "cocked" position of FIG. 10A. Arrow 235 shows the motion of the ball as it continues its upward launch.

FIG. 11A shows the sensing mechanism 240 of the preferred embodiment of the present invention 95 including an electro-mechanical switch 117 having a pair of switch outputs 243 and 245 and a moveable or positionable, elongated switch member or sensing member 19 which is connected to the switch 117 via a pivot pin or similar mechamism 242. The switch arm 119 is normally spring-biased in a first position, as shown in FIG. 11A, so that it is disposed at least partially through the sensing aperture 115 so that its non-connected end portion extends into the hollow interior 109 of the launch tube 93 and into the track 111 of a downwardly rolling ball 33. The switch arm 119 is normally spring-biased in this positon and for as long as it is in this position, the switch 117 remains in an "off" state so that no signal is generated between the output lead or outputs 243 and 245.

FIG. 11B illustrates the ball 33 as rolling down the track 111 until it contacts the inwardly extending end portion of the sensing arm or switch member 119. At this point, the weight of the ball 33 overcomes the normal bias of the switch member 119 and depresses the inwardly-extending end portion of the switch arm 119 back into the sensing aperture 115 and out of the track or path 111 of the rolling ball 33. The directional arrow 249 is used to indicate that the ball is rolling smoothly downward along the track or path 111 within the hollow interior 109 of the launch tube 93 toward the closure member 97 at the lower end, not shown in FIG. 11A and 11B. Reference numeral 247 shows the actual point of contact between the exterior surface of the ball 33 and the inwardly extending end portion of the switch arm 119. When the switch arm 119 is moved to this second or opposite position, it causes the switch 117 to change to its "on" state causing an electrical output or trigger signal to appear between the output leads 243 and 245, as known in the art and as hereinafter described. The directional arrow 249 indicates that the ball 33 continues rolling along the track 111 past the spring arm 119 (allowing it to be self-biased back into the first position to terminate the generation of the trigger signal) as it proceeds in the direction of the arrow 249 toward the ultimate "ready" position 167 adjacent the closure member 97 at the lower end of the tube 93, as shown in FIG. 10A.

FIGS. 12 and 13 show an alternate embodiment to the upper or top collection portion 77 of the ball-throwing apparatus of the preferred embodiment of FIGS. 4, 5 and 6. In the embodiment of FIGS. 12 and 13, the generally square horizontal plate 61 having the supply aperture 63 disposed in the center thereof comunicates with a ball-conducting conduit via the hollow interior 135 which is disposed in the center of the top portion 77 instead of being disposed between the center and the front plate or panel 49. In FIG. 12 it will be observed that the square base 61 is disposed equal distance between the elongated rectangular sides 43 and 45 and equal distance between the rear end panel 47 and the front end panel 49. It will also be seen that all of the interior sides 65, 67, 69 and 71 slope downwardly and inwardly toward the four sides of the square plate 61 so that no matter where the ball is dropped within the upper distal edges 57, it rolls down one of the inwardly sloped surfaces to be dropped through the aperture 63 and into the hollow interior of the launch tube 93, as illustrated in FIG. 12. It will be understood, that in the earlier-described embodiment of the ball-collecting top portion 77, that the upper portions 59 of the rear panel 47 and the upper portion 71 of the front panel 49 can be either vertical or inwardly sloped, or different from one another, without greatly affecting the operation previously described. However, when the aperture 63 is disposed in the center of the top ball-collecting portion 77, it is essential that all four surfaces extending downwardly to the four sides of the plate 61 be sloping surfaces, as shown in FIG. 12.

FIG. 13 illustrates that the ball-supplying aperture 63 opens onto the hollow interior 253 of a ball-conducting conduit 251 whose opposite end is contiguous with or corresponds to the ball-loading aperture 113 of the hollow launch tube 93. The ball 33 then passes into the hollow interior 109 of the tube 103 and, after some additional bouncing as it moves downward therein, it settles into a smooth rolling motion, and under the force of gravity alone, proceeds downwardly in the tube 93 until it reaches the "ready" position 167 of FIG. 10A, as previously described.

FIG. 14 shows an electrical schematic diagram of the preferred embodiment of the control circuit or system of the present invention. In FIG. 14, the control circuitry 261 is shown as including a first electrical or electro-mechanical switch 263 having an elongated switch actuation arm or member 265. The circuitry 261 also includes a conventional solid state digital time delay/relay 273 including an eight-connector unit 271 having connector pins P1-P8. A lead 269 is connected between the switch input terminal of switch 263 and the P4 pin of the pin connector unit 271 of the time delay/relay 273. A second lead 267 extends from the output of the switch 263 to the P5 pin of the pin connector unit 271 of the time delay/relay 273. The time delay/relay 273 is, as conventionally known, a commercially available device, such as a time delay/relay manufactured by Dayton Electric Manufacturing Company of Chicago, Ill. as Model No.'s 5X828E+, 6X153E+, 6X601E+, and the like. Such a time delay/relay 273 combines solid state digital timing circuits with an electro-mechanical relay for the control of power loads.

A conventional 110V AC input 275 is connected to a source of external AC power, as previosuly described, and the input leads 277 and 279 are connected to the pins P7 and P1, respectively, of the pin unit 271 of the time delay/relay 273, respectively. The input of the solenoid 285 is conencted via lead 281 to pin P3 of the pin connector unit 271 of the time delay/relay 273 while the solenoid output is connected via lead 283 to the P6 pin of the pin connector unit 271 of the time delay/relay 273. As shown in FIG. 14, solenoid 285 includes a plurality of coils or wires 287 wraped about a hollow longitudinal core 289 to form a central passage or core through the longitudinal length of the solenoid 285. The coil is comprised of a continuously would wire 287 which is would about the hollow core 289 and to form same, as conventionally known in the art. Positioned longitudinally within the hollow central core 289 is an elongated thrust member 291 having a first or forward end portion 293 containing an impact surface 297 at its distal end and a second or rear end portion 295.

Under normal operation, when the solenoid 285 has its electrical coil or solenoid coil 287 de-energized, the thrust member or rod 291 is biased to be positioned as shown in FIG. 14 with the front end portion 293 being retracted a greater distance into the hollow core 289 than the rear end portion 295. When the solenoid coil 287 is energized, the rod 291 is fired or thrust forwardly so that the front end portion 293 extends a far greater distance out of the hollow interior or core 289 and the contact surface 297 can extend through the firing aperture and contact the ball in its "ready" position for firing same, as previously described. Immediately after firing, the solenoid coil 287 will again be de-energized to draw or retract the front end portion 293 back into the hollwo interior 289 of the core of the solenoid 285 so that the rear portion 295 of the thrust member or rod 291 extends to a greater distance rearwardly of the solenoid 285 when it is in its "cocked" or normally de-energized state.

FIG. 15 is a electrical schematic representation illustrating generally the operation of the circuit or system 261 of FIG. 14 without the use of the time delay/relay 273 for the purpose of explanation only. In FIG. 15, the 110V AC input 275 is connected to the solenoid 285 through a double-pull, double-throw, relay-operated switch assembly 301 having a first normally-open swtich 303 which includes a relay-operated switch arm 305 and an electrical switch contact 307. The double-pull, double-throw switch assembly 301 also includes a second normally-open swtich 309 having a normally-open switch arm 311 and a corresponding electrical switch contact 313.

Both of the switch arms 305 and 311 are relay-operated, as indicated by the dashed line 330, and both are normally open so that no power is suppled to the solenoid 285 causing it to remain in its normal or non-energized state. Whenever power is supplied to the 110V AC input 275, power is supplied via leads 277 and 279 to the switch arms 305 and 309, respectively, of the switches 303 and 309, respectively, of the switching unit 301. However, no power is supplied to the solenoid 285 until the switch elements 305 and 311 are closed upon the contacts 307 and 313, as hereinafter described. Switch contact 307 is connected via lead 283 to one terminal of the solenoid 285 while the opposite terminal of the solenoid 285 is connected via lead 281 to the switch contact 313. Again, the solenoid 285 is shown in the de-energized state wherein the front end 293 of the elongated longitudinal thrust member or rod 291 is substantially withdrawn or retracted into the hollow interior or core 289 of the solenoid 285 in a "cocked" position to await firing when the relay coil thereof is energized.

Meanwhile, let us assume that the ball 33 is dropped into the collection area, and passes through the collection aperture and ball-conducting conduit to drop through the load aperture of the launch tube and into the hollow interior thereof. As it strikes the hollow interior, it will initially bounce as it begins to roll downward along the roll track and at some point along the roll track, it will roll over the switching arm causing the normally-open switching arm 317 of the normally-open switch 315 to close on contact 319 and supply an electrical trigger or control signal to the time delay circuit 323 via lead 321. The extent or duration of the time delay can be manually adjusted, and it will normally be selected so that the delayed trigger signal outputs on lead 325 after a predetermined time sufficient for the ball to roll past the sensing aperture, contact the iner surface of the rear end closure element and stop bouncing to settle into a steady state "ready" or "firing" position, as previously described.

After the ball has had sufficient time to come to rest in the "ready" or "firing" position, the delay circuit 323 will pass a delayed electrical trigger, control or command signal along lead 325 and through the relay coil 327 to ground so as to energize the relay coil 327. The energization of the relay coil 327 causes the closing of the switch elements 305 and 311, as indicated by the relay-operated dashed line 330, and the closure of the switch elements 305 and 311 of the normally-open switches 303 and 309 of the switch assembly 301 connects the switch elements 305 and 311 to the contacts 307 and 313, respectively, thus supplying the 110V AC input power from the input 275 to the electrical solenoid terminals via leads 277 and 279, closed switch elements 305 and 311, and leads 283 and 281, respectively. This, as previously described, will energize the coil 287 of the solenoid 285 and fire the thrust member or rod 291 longitudinally forward so that the front end portion 293 and its impact surface 297 extends through the firing aperture at the closure end of the tube, initially impacts the ball positioned in the "ready" or "firing" position, and continues to move forward as the ball is propelled up the hollow interior of the tube and out the launch aperture so it may continue along its airborne trajectory or path of flight to be chased, fetched and returned by the dog to begin the cycle anew.

FIG. 16 includes an optical sensor 329 wherein a light-emitting diode or LED 331 emits light waves 335 which are normally detected by the base of the phototransistor 333 and, depending on the configuration, the failure of the light waves 335 to reach the base of the phototransistor 333 can be used to generate or stop the generation of a control signal which may be used as a trigger signal whenever the ball passes between the LED 331 and the phototransistor 333 to block the passage of light therebetween. Any similar, conventional, electrical, electro-mechanical, opto-electrical or optical system may be used for sensing the presence of the ball at a particular point in the launch tube and generating the trigger signal for use as previously described, as known in the sensing art.

It will be understood, by those of ordinary skill in the art, that the shape of the cylindrical launch tube need not be a right cylinder. The shape could, for example, be of an oval-shaped cross section, square, rectangular, or of a continuously increasing dimension, as desired. However, the circular cross-section of the preferred embodiment appears to be best-suited for a clean launch at maximum initial velocity. Furthermore, the exact ratio of the internal diameter of the hollow interior of the launch tube to the diameter of the ball could also be varied. For example, the inside diameter could go from just slightly greater than the diameter of the ball to much, much greater, such as two times the diameter of the ball, but in the preferred embodiment, an intermediate ratio was used. It will also be understood that various means can be used in both the preferred embodiment and in the alternative embodiment to vary the azimuth or direction of the shot or throw and to control the elevation.

If for example, the firing aperture were an oval having its long axis oriented with the vertical center axis of the front panel, the elevation could be controlled, and if the axis were oriented horizontally, the azimuth could be varied. Similarly, different front panels could be used, each having an aperture placed higher or lower than another, and the distal end or open mouth of the launch tube could be positioned within or adjacent to these different apertures simply by changing the front panel and positioning the open mouth of the tube within the launch aperture. Furthermore, it will be understood that the positioning means for the tube could be a solid triangular ramp or any type of mechanism known to the art so long as the front end of the tube is positioned at a vertically higher elevation than the rear end of the tube to ensure a path of flight or flight trajectory for the ball launched, thrown, or tossed therefrom.

Furthermore, the collecting means used in the various embodiments of this invention could be varied in shape and size, to suit the needs of the user without changing the present invention. As previsouly stated, the number of downwardly sloping sides and vertical sides of the top ball-collecting portion can also be varied, without departing from this invention.

Anyone of ordinary skill in the electrical arts will realize that the means for detecting the presence of the ball at a predetermined position as it rolls down the hollow interior of the tube are many. For example, electrical means, mechanical means, electro-mechanical means, optical means, electro-optical means, and the like can be used, a known in the art, to sense the presence of the ball at a particular location as it rolls down the hollow interior of the tube.

It will also be understood that various means can be used to provide a delay sufficient to ensure that the ball has come to rest at the bottom of the tube in its "firing" or "ready" position prior to energizing the solenoid for the launch. Yet further, it will also be understood that the ball-firing mechanism can be anything actuatable by an electrical command to impact the ball at its "ready" position, and not necessarily the central thrust rod of an electrical solenoid, as used herein. Lastly, it will be understood that this Patent Application was written and is primarily directed toward the use of the ball-launching apparatus of the present invention for playing throw and fetch with a pet dog, but it will also be realized that any ball-fetching animal could be exercised and amused by the present apparatus even including the use of the present apparatus with small children to keep them occupied while a parent watches them at his or her leisure.

Furthermore, as previously stated, it will also be understood that the present apparatus can be used to play throw and catch with a dog, a small child, a youth, or other ball-retrieving animal while the owner or human being rests, even after a normal human being gets tired, by human beings having little physical strength for throwing the ball and the like. Adults may even be entertained, as well as children, by watching the operation of the ball-launching apparatus of the present invention, and it may even be used for entertainment at carnivals, or the like, where a ball is manually placed in the ball-collecting area or hopper and fed into the barrel for firing by a contestant trying to knock over something or hit something such as a target or the like.

Therefore, it will be recognized by those of ordinary skill in the art that various modifications, variations, substitutions, changes, and alterations can be made in the form, structure, circuitry, detail and method of operation of the present invention without departing from the actual spirit and scope thereof, which is limited only by the appended claims.

I claim:

1. A doggie toy apparatus for launching a ball on an airborne trajectory, and for continuing to repeatedly re-launch the ball for as long as a dog fetches said launched ball and returns same for re-launching, said doggie toy apparatus comprising:

a launch tube means for launching a ball loaded therein on an airborne trajectory to be chased, fetched and returned by the dog;

said launch tube means including an elongated cylindrical barrel having an elongated, hollow, longitudinal interior, an open front end comprising a ball-launching aperture, and a substantially closed, opposite rear end;

means for mounting said launch tube such that said ball-launching aperture is elevated a first predetermined distance above a horizontal plane passing through said substantially closed, opposite rear end such that the longitudinal central axis of said hollow interior of said elongated cylindrical barrel forms an acute angle with respect to said horizontal plane for launching said ball on said airborne trajectory;

said elongated cylindrical barrel including an inner diameter substantially equal to the diameter of said ball-launching aperture, both said inner diameter of said elongated cylindrical barrel and said diameter of said ball-launching aperture being substantially greater than the diameter of said ball for reducing air resistance during the ball launch, said elongated cylindrical barrel further including a front end portion including said front end ball-launching aperture, a rear end portion immediately adjacent to and contiguous with said substantially closed, opposite rear end, and an intermediate barrel portion integrally coupled between and contiguous with said front and rear end portions, said elongated cylindrical barrel also including a first aperture operably disposed in said substantially closed, opposite rear end along the vertical center plane thereof and spaced a second predetermined distance below the horizontal center plane thereof, an upper, arcuately-curved barrel wall portion extending the length of said barrel, an opposite, lower, arcuately-curved barrel wall portion extending the length of said barrel and integral with said upper, arcuately-curved barrel wall portion, a second aperture operatively disposed in said opposite, lower, arcuately-curved barrel wall portion a third predetermined distance forward of said substantially closed rear end, and a third aperture operatively disposed in said upper, arcuately-curved barrel wall portion a fourth predetermined distance rearwardly from said front ball-launching aperture, said first and second apertures being dimensioned significantly less than the diameter of said ball, and said third aperture having a diameter substantially greater than the diameter of said ball for laoding a return ball into the hollow interior of said barrel, said elongated cylindrical barrel further having a "ball ready" position immediately adjacent said closed rear end wherein said ball having rolled down the hollow interior of said barrel and contacted said closed rear end, finally comes to rest on the inner arcuately-curved surface of said opposite, lower, arcuately-curved barrel wall portion such that the center of gravity of said ball is longitudinally aligned with said first aperture;

a ball return means including an upper ball-receiving opening, a lower ball-feeding aperture having a diameter greater than the diameter of said ball, the dimensions of said upper ball-receiving opening being much greater thanthe dimensions of said lower ball-feeding aperture, and wall-forming means intermediate said ball-receiving opening and said ball-feeding aperture and sloping downwardly from said upper, ball-receiving opening and inwardly toward said ball-feeding aperture for collecting any returned ball dropped or otherwise deposited within said ball-receiving opening and directing said ball downwardly toward and through said ball-feeding aperture via the force of gravity alone, said ball-feeding aperture being at least one of corresponding to said third ball-loading aperture of said elongated cylindrical barrel and coupled thereto via a ball-transporting chute means interconnecting said ball-feeding aperture and said third ball-loading aperture for supplying said returned ball and re-loading same into the hollow interior of said elongated cylindrical barrel;

ball-sensing means mounted proximate the exterior surface of said intermediate portion of said elongated cylindrical barrel such that at least a portion thereof extends at least one of into and through said second aperture and into the path of said loaded ball rolling downwardly within the hollow interior of said barrel for detecting said ball rolling over said second aperture and generating a trigger signal in response thereto; and means operatively disposed rearwardly of said substantially closed rear end of said barrel and adjacent said first aperture and being responsive to (1) said ball coming to rest in said "ball ready" position and (2) the generation of said trigger signal for launching said ball through the hollow interior of said barrel, out of said front ball-launching aperture, and into said airborne trajectory to be chased, fetched, and returned by said dog.

2. The doggie toy apparatus of claim 1 wherein said elongated cylindrical barrel includes a right circular cylinder, the inside diameter of said barrel being significantly greater than the diameter of said ball for miniminzing air pressure build-up within said hollow interior which would otherwise reduce the initial velocity of the launched ball.

3. The doggie toy appartus of claim 1 wherein at least said elongated cylindrical barrel includes at least one of a transparent and translucent plastic material for enabling an observer to visually view the operation of at least said launch tube means.

4. The doggie toy apparatus of claim 1 further including a box-like housing means for enclosing at least said launching tube means, said mounting means, said ball-sensing means, and said ball-launching means.

5. The doggie toy apparatus of claim 4 wherein said box-like housing means comprises:

a pair of similarly-dimensioned, oppositely disposed, generally rectangular side panels each having a plane substantially parallel to the plane of the other;

a generally rectangular rear panel;

a similarly-dimensioned, oppositely disposed, generally rectangular front panel, the planes of said front and rear panels being generally parallel to one another and generally perpendicular to the planes of said opposite side panels;

a ball-launching circular front aperture operatively disposed in the front panel along the vertical center line thereof and spaced a sixth predetermined distance above the horizontal center line thereof, the diameter of said ball-launching circular front aperture being at least one of substantially equal to the outside diameter of said elongated cylindrical barrel if the front end thereof extends therein or therethrough and substantially equal to the inside diameter of said hollow interior of said barrel if the distal front end thereof is coterminous with and abutting said ball-launching circular front aperture;

an elongated, generally rectangular bottom panel adapted to be operably disposed on a generally horizontal surface and including a plane generally perpendicular to the planes of said opposite side panels, said front panel, and said rear panel, and coterminous with the lower edge portions thereof for forming a general box-like enclosure having an open top and a hollow interior;

top structure means mounted about the top edge portions of said opposite side panels, said front panel and said rear panel for substantially closing said box-like enclosure and forming a hollow interior therein; and said top structure means including an upper ball collection area at least the size of said bottom panel, a lower ball-receiving surface, a ball-feeding aperture operably disposed centrally within said lower bal-receiving surface, said ball-receiving surface being dimensioned such that any ball coming into contact therewith must, by the force of gravity alone, fall into and through said ball-feeding aperture to be loaded into the hollow interior of said barrel via said ball-loading aperture, and downwardly and inwardly sloping surface means operably extending between said upper ball collection area and said lower ball-receiving surface for guiding any ball at least one of dropped into or otherwise deposited within said collection area into said ball-receiving aperture solely by the force of gravity.

6. The doggie toy apparatus of claim 5 wherein said ball collection area includes a raised rim extending at least a seventh predetermined distance above the upper end of said downwardly and inwardly sloping surface means, said rim including the vertically extending upper edge portions of said opposite side panels, said front panel and said rear panel joined to form an open top rectangular collection area having vertical sides for preventing the escape of any ball dropped or otherwise deposited therein.

7. The doggie toy apparatus of claim 6 wherein said ball-feeding aperture and said lower ball-receiving surface are disposed at the proximate center of said top strucutre means and said apparatus further includes a substantially hollow ball conduit means joining said ball-feeding aperture and said ball-loading aperture.

8. The doggie toy apparatus of claim 6 wherein said ball-feeding aperture and said lower ball-receiving surface are disposed on the longitudinal center line of said top structure means and spaced an eighth predetermined distance from the rear of said front panel, and wherein said ball-feeding aperture is at least one of coterminous and coexistent with said ball-loading aperture and operatively coupled to said ball-loading aperture via a ball conduit means operatively connected therebetween.

9. The doggie toy apparatus of claim 5 wherein said ball-feeding aperture and said lower ball-receiving surface are disposed at the proximate center of said top structure means and said apparatus further includes a substantially hollow ball conduit means joining said ball-feeding aperture and said ball-loading aperture.

10. The doggie toy apparatus of claim 5 wherein said ball-feeding aperture and said lower ball-receiving surface are disposed on the longitudinal center line of said top structure means and spaced an eighth predetermined distance to the rear of said front panel, and wherein said ball-feeding aperture is at least one of coterminous and coexistent with said ball-loading aperture and operatively coupled to said ball-loading aperture via a ball conduit means connected therebetween.

11. The doggie toy apparatus of claim 1 wherein said ball-sensing means includes electromechanical ball-detecting means.

12. The doggie toy apparatus of claim 1 wherein said ball-sensing means includes at least one of electrical means, electromechanical means, mechanical means, electro-optical means, and optical means for detecting the passage of a ball over said second aperture.

13. The doggie toy apparatus of claim 1 wherein said sensing means includes an electrical switch having a normally-open "off" switch state and a closed "on" switch state, said electrical switch further including an elongated switching arm normally biased to a first switch arm position for maintaining said electrical switch in said normally-open "off" switch state and mechanically movable to a second switch arm position for switching said electrical switch from said normally-open "off" switch state to said closed "on" switch state and generating said trigger signal in response thereto, said sensing means being mounted on the exterior surface of said elongated cylindrical barrel such that said elongated switching arm extends at least partially through said second aperture and into the path of a ball rolling downwardly within the hollow interior or said barrel when said elongated switch arm is in said first switch arm positon, said elongated switch arm being responsive to the passage of said downwardly rolling ball thereover for moving from said first switch arm positon to said second switch arm position and turning said electrical switch from said "off" state to said "on" state to generate said trigger signal in response thereto.

14. The doggie toy apparatus of claim 13 wherein said ball-launching means comprises:
a solenoid incluidng a solenoid coil having a hollow core therethrough;
an elongated longitudinal solenoid rod mounted for reciprocal movement within said hollow core;
the longitudinal axis of said solenoid rod being aligned with said first aperture and the center of gravity of a ball at rest in said "ball ready" position;
said solenoid having a first end portion terminating in a ball-impacting surface, said first end portion having a first reciprocal position wherein said impact surface is displaced a ninth predetermined distance rearwardly of said second aperture when said solenoid coil is de-energized and a second reciprocal position wherein said impact surface and at least a tenth predetermined length of said first end portion of said solenoid rod extends through said second aperture and into the hollow interior of said barrel when said solenoid coil is energized;
a source of AC electrical power for energizing said solenoid coil;
electrical conductor means for transmitting said AC electrical power from said source to said solenoid coil; and
control means operatively coupled in said conductor means and responsive to said trigger signal for controlling the supply of said AC electrical power to said solenoid coil for energizing and de-energizing same.

15. The doggie toy apparatus of claim 14 wherein said control means includes a relay-operated switching means operatively connected in said electrical conductor means, said relay-operated switching means being normally open to maintain said solenoid coil de-energized, but being responsive to a switch control signal for closing to conduct said AC electrical power to said solenoid coil for energizing same;

and wherein said control means further includes:
- a relay coil having a de-energized state for maintaining said relay-operated switching means open and an energized state for closing said relay-operated switching means and energizing said solenoid coil;
- said energized state of said relay coil corresponding to said switch control signal; and
- means for delaying the energization of said relay coil and the resulting generation of said switch control signal for a predetermined period of time after the generation of said trigger signal, said predetermined period of time being sufficient for said ball to bounce off of the substantially closed rear end of said elongated cylindrical barrel and come to rest in said "ball ready" position to await launching.

16. The doggie toy apparatus of claim 15 wherein said delay means includes manually-operable means for selectively adjusting said predetermined period of time.

17. The doggie toy apparatus of claim 16 further including a box-like housing means for substantially enclosing at least said launching tube means, said mounting means, said ball-sensing means, and said ball-launching means.

18. The doggie toy apparatus of claim 17 wherein said box-like housing means comprises:
- a pair of similarly-dimensioned, oppositely disposed, generally rectangular side panels each having a plane substantially parallel to the plane of the other;
- a generally rectangular rear panel;
- a similarly-dimensioned, oppositely disposed, generally rectangular front panel, the planes of said front and rear panels being generally parallel to one another and generally perpendicular to the planes of said opposite side panels;
- a ball-launching circular front aperture operatively disposed in the front panel along the vertical center line thereof and spaced a sixth predetermined distance above the horizontal center line therof, the diameter of said ball-launching circular front aperture being at least one of substantially equal to the outside diameter of said elongated cylindrical barrel if the front end thereof extends therein or therethrough and substantially equal to the inside diameter of said hollow interior of said barrel if he distal front end is coterminous or coexisting with said ball-launching circular front aperture;
- a elongated, generally rectangular bottom panel adapted to be operably disposed on a generally horizontal surface and including a plane generally perpendicular to the planes of said opposite side panels, said front panel, and said rear panel, and coterminous with the lower edge portions thereof for forming a box-like enclosure having an open top and a hollow interior;
- top structure means mounted about the top edge portions of said opposite side panels, said front panel and said rear panel for substantially closing said box-like enclosure and forming a hollow interior therein; and
- said top structure means including an upper ball collection area substantially the size of said bottom panel, a lower ball-receiving surface, a ball-feeding aperture operably disposed centrally within said lower ball-receiving surface, said ball-receiving surface being dimensioned such that any ball coming into contact therewith must, by the force of gravity alone, fall into and through said ball-feeding aperture to be loaded into the hollow interior of said barrel via said ball-loading aperture, and downwardly and inwardly sloping surface means operably extending between said upper ball collection area and said lower ball-receiving surface for guiding any ball at least one of dropped into or otherwise deposited within said collection area into said ball-receiving aperture solely by the force of gravity.

19. The doggie toy apparatus of claim 18 wherein said ball collection area includes a raised rim extending a seventh predetermined distance above the upper end of said downwardly and inwardly sloping surface means, said rim including the vertically extending upper edge portions of said opposite side panels, said front panel and said rear panel joined to form an open top rectangular collection area having vertical sides for preventing the escape of any ball dropped or otherwise deposited therein.

20. The doggie toy apparatus of claim 19 wherein said ball-feeding aperture and said lower ball-receiving surface are disposed at the proximate center of said top structure means and said apparatus further includes a substantially hollow ball conduit means joining said ball-feeding aperture and said ball-loading aperture.

21. The doggie toy apparatus of claim 19 wherein said ball-feeding aperture and said lower ball-receiving surface are disposed on the longitudinal center line of said top surface means and spaced an eighth predetermined distance from the rear of said front panel, and wherein said ball-feeding aperture is at least one of coterminous and coexistent with said ball-loading aperture and operatively coupled to said ball-loading aperture via a ball conduit means operatively connected therebetween.

22. The doggie toy apparatus of claim 18 wherein said ball-feeding aperture and said lower ball-receiving surface are disposed at the proximate center of said top structure means and said apparatus further includes a substantially hollow ball conduit means joining said ball-feeding aperture and said ball-loading aperture.

23. The doggie toy apparatus of claim 18 wherein said ball-feeding aperture and said lower ball-receiving surface are disposed on the longitudinal center line of said top structure means and spaced an eighth predetermined distance to the rear of said front panel, and wherein said ball-feeding aperture is at least one of coterminous and coexistent with said ball-loading aperture and operatively coupled to said ball-loading aperture via a ball conduit means connected therebetween.

24. The doggie toy apparatus of claim 1 wherein said ball-receiving means includes a funnel-like apparatus having a first circular aperture at the upper end thereof representing said ball-receiving aperture, a second circular aperture at the lower end thereof representing said ball-loading aperture, and a hollow funnel-shaped intermediate wall portion between said first and second circular openings, and wherein the diameter of said first circular aperture is much greater than the diameter of said second circular aperture for ball-receiving purposes, and wherein the diameter of said second circular aperture is greater than the diameter of said ball for allowing the passage of said ball freely therethrough and into the hollow interior of said barrel via said ball-loading aperture.

25. A toy apparatus for dogs which shoots a dog's ball along an airborne trajectory and allows a dog to repeatedly fetch the automatically re-shot ball as long as the dog returns the fetched ball after each fetch, said toy apparatus comprising:

a shooting tube means for shooting the ball along said airborne trajectory, said shooting tube means including an elongated barrel having a substantially hollow interior, an upper end portion terminating in an open barrel mouth at the upper distal end thereof, and an opposite lower end portion terminating in a substantially closed lower distal end;

means for positioning said barrel such that said open mouth is a predetermined distance vertically above said substantially closed, opposite, lower distal end for forming an acute angle between the longitudinal axis of said barrel and a horizontal plane through said substantially closed, opposite, lower distal end;

ball-receiving means for collecting a fetched ball returned by said dog and for guiding said collected ball into the hollow interior of said barrel;

means for sensing the presence of said ball as it rolls down the hollow interior of said barrel to a position adjacent to and spaced a predetermined distance from said substantially closed, opposite, lower distal end, and for generating a command signal indicative thereof; and ball-shooting means responsive to said generated command signal for re-shooting said ball after it comes to rest in a shooting position adjacent said substantially closed opposite, lower distal end of said barrel.

26. The toy apparatus of claim 25 wherein said barrel is an elongated right circular cylinder having a longitudinal central axis, an inside circular diameter "d1", an upper arcuate interior surface and a lower arcuate interior surface.

27. The toy apparatus of claim 26 wherein said diameter "d1" is greater than the diameter of the ball. .

28. The toy apparatus of claim 27 wherein said diameter "d1" is significantly greater than the diameter of the ball.

29. The toy apparatus of claim 25 wherein said positioning means includes a ramp having a triangular cross-section.

30. The toy apparatus of claim 25 wherein said positioning means includes manually-adjustable means for selectively setting the elevation of said barrel.

31. The toy apparatus of claim 30 wherein said positioning means further includes manually-adjustable means for selectively controlling the relative azimuth of said barrel.

32. The toy apparatus of claim 25 wherein said positioning means includes manually-adjustable means for selectively controlling the relative azimuth of said barrel for aiming purposes.

33. The toy apparatus of claim 25 wherein said ball-collecting means includes a generally funnel-shaped member having a hollow passage therethrough, an upper open end having a diameter "d1", an opposite lower end having a diameter "d2", where "d1" is much, much greater than "d2" and where "d2" is substantially greater than the diameter of the ball, and interior funnel-shaped ball-guiding surfaces disposed between said upper and lower open ends, said barrel having a ball input aperture in the upper end portion thereof, said upper end of said funnel-shaped member being adapted to collect the fetched balls returned by said dog and at least one of dropped and otherwise deposited therein, said lower end of said funnel-shaped member being coextensive with said ball input aperture, and the interior funnel-shaped surfaces being adapted to guide said colelcted ball downwardly under the force of gravity and through said ball input aperture for feeding the ball into the hollow interior of said barrel for shooting purposes.

34. The toy apparatus of claim 25 wherein said barrel includes an upper, outwardly disposed, arcuately-curved exterior portion and a lower, opposite, inwardly-disposed, arcuately-curved interior portion, an intermediate portion integrally disposed between said upper and lower end portions, a ball-firing position within said hollow interior of said barrel and proximate said closed lower distal end, and a ball-loading aperture formed in said upper, outwardly-disposed, arcuately-curved exterior portion of said intermediate portion of said barrel and communicating with the hollow interior thereof for feeding a ball into said hollow interior, said ball rolling down said barrel along siad lower inwardly-disposed, arcuately-curved portion within the hollow interior of said barrel under the force of gravity and eventually coming to rest in said ball-firing position.

35. The toy apparatus of claim 34 wherein said ball-receiving means includes means for receiving siad returned ball and directing same toward said ball-loading aperture.

36. The toy apparatus of claim 35 wherein said ball-receiving means includes a plurality of downwardly sloping surfaces for guiding said returned ball into said ball-loading aperture.

37. The toy apparatus of claim 35 wherein said ball-receiving means includes a generally funnel-like construction having a lower end opening at least one of corresponding to and communicating with said ball-loading aperture.

38. The toy apparatus of claim 34 further comprising a housing means for substantially enclosing at least said shooting tube means, said positioning means, said sensing means, and said ball-shooting means.

39. The toy apparatus of claim 38 wherein said housing means includes a generally rectangular box-like structure having a pair of oppositely disposed longitudinal side panels, a front panel having an outlet aperture dimensioned to conform to said open mouth of said barrel, a real panel, a bottom portion and a top portion having a ball-receiving aperture operatively disposed in the lowest portion thereof.

40. The toy apparatus of claim 39 wherein said top portion includes at least a poriton of said ball-receiving means including a generally rectangular, upwardly-disposed rim means for preventing the escape of any ball dropped on said top portion, a ball-receiving aperture communicating with said ball-loading aperture operatively disposed at the lowest level of said top portion, and a plurality of downwardly sloping surface means extending inwardly from said rim means toward said ball-receiving aperture for giding any returned ball at least one of dropped and otherwise deposited on said downwardly sloping surface means to roll under the force of gravity alone toward and into said ball-receiving aperture for loading into the hollow interior of said barrel via said ball-loading aperture.

41. The toy apparatus of claim 40 wherein said ball-receiving aperture is disposed in the proximate center of said top portion.

42. The toy apparatus of claim 41 wherein said ball-receiving means further includes a hollow conduit means having one end communicating with said ball-receiving aperture and its opposite end communicating with said ball-feeding aperture for supplying any ball passing through said ball-receiving aperture toward and through said ball-laoding aperture and into said hollow interior of said barrel.

43. The toy apparatus of claim 40 wherein said ball-receiving aperture is operably disposed in the bottom of said top portion between said front panel and the center of said top portion.

44. The toy apparatus of claim 43 wherein said ball-receiving means further includes a hollow conduit means having one end communicating with said ball-receiving aperture and its opposite end communicating with said ball-feeding aperture for supplying any ball passed through said ball-receiving aperture toward and through said ball-loading aperture and into said hollow interior of said barrel.

45. The toy apparatus of claim 34 wherein said barrel includes a sensing aperture operably disposed through said lower inwardly disposed arcuately-curved interior portion and communicating with said hollow interior of said barrel.

46. The toy apparatus of claim 45 wherein said sensing means is operably disposed at least one of within and at least partially through said sensing aperture for detecting the passage of a downwardly descending ball rolling over said sensing aperture along said lower inwardly disposed arcuately-curved portion.

47. The toy apparatus of claim 46 wherein said sensing means includes an electro-mechanical device responsive to the rolling passage of said ball over said sensing aperture for generating said command signal.

48. The toy apparatus of claim 46 wherein said sensing means includes a light source and a light detector.

49. The toy apparatus of claim 46 wherein said sensing means includes an electro-mechanical switch having an elongated switch member, said switch having a normally-off switching state whenever said elongated switch member is in a first sensing position and a second "on" switching state whenever said elongated switch member is moved to a second ball-detection position, said switch being operatively disposed on the exterior of said barrel and at least one of within and adjacent to said sensing aperture such that said elongated switch member extends at least partially through said sensing aperture, above the level of said lower, inwardly disposed, arcuately-curved interior of said barrel and into the path of any ball rolling downwardly therealong when said elongated switch member is in said first sensing position, said elongated switch member being responsive to physical contact with the downwardly rolling ball and its passage thereover for switching to said second position and turning said switch on to generate said command signal.

50. The toy apparatus of claim 34 wherein said closed distal lower end of said barrel ncludes a ball-firing aperture therethrough, and wherein said ball-shooting means further includes an elongated rod having a ball-impacting end portion, said elongated rod having a cocked position wherein said ball-impacting end portion is disposed exterior to the hollow interior of said barrel and longitudinaly aligned with said ball-firing aperture and a fired position wherein said ball-impacting end portion extends longitudinally through said ball-firing aperture and into the hollow interior of said barrel for impacting said ball disposed in said firing position and thrusting same upwardly through the hollow interior of said barrel, out of said open mouth, and into said airborne trajectory, said elongated rod shifting from said cocked position to said fired position at a predetermined time after the generation of said command signal.

51. The toy apparatus of claim 50 wherein said ball-shooting means further includes an electrical solenoid having a solenoid coil formed about a holow, central, longitudinal core and a longitudinally oriented central solenoid rod mounted within said core and having a first non-extending cocked rod position whenever said solenoid coil is de-energized and a second extended fired position once said solenoid coil is energized.

52. The toy apparatus of claim 51 wherein said ball-shooting means further includes an electrical delay means responsive to said generated command signal for generating a delayed command signal at a predetermined later time, said predetermined later time being at least sufficient to enable the ball, rolling down the hollow interior of said barrel and bouncing off of said closed distal end, to come to rest in said ball-firing position, and means responsive to said delayed command signal for energizing said solenoid coil to fire said positioned ball.

53. The toy apparatus of claim 52 wherein said means responsive to said delayed command signal include normally-open switching means operatively coupled to said source of electrical energy for energizing said solenoid coil, said switching means being responsive to said delayed command signal for switching from a normally-open state to a closed state for powering said solenoid coil for energizing same and firing said positioned ball.

54. The toy apparatus of claim 53 wherein said source of electrical potential includes a pair of 110 VAC inputs, a first electrical connection between one of said 110 VAC inputs and the input of said solenoid coil, a second electrical connection between the other of said 110 VAC inputs and the output of said solenoid coil, first and second, normally-opened, relay-operated switching elements operatively disposed in said first and second electrical connections, and a relay coil means responsive to said delayed command signal for closing said first and second relay-operated switching means to complete an electrical path between said 110 VAC source and said solenoid coil for energizing same and launching said ball out of said launching tube and into said airborne trajectory to be chased, fetched, and returned by said dog.

55. An automatic ball-throwing system for throwing and re-throwing a ball for enabling a ball-fetching aminal to chase and fetch the ball over and over again for as long as the animal continues to return the fetched ball after each chase, said automatic ball-throwing system comprising:
    an elongated cylinder including a hollow interior, a longitudinal axis through said hollow interior, a front end portion having an open mouth at the distal front end thereof, a rear end portion having closure means at the distal rear end thereof, an intermediate cylindrical portion integrally connecting said front and rear end portions, a top cylindrical wall extending the length of said cylinder, a bottom cylindrical wall opposite said top cylindrical wall and extending the length of said cylinder, said bottom cylindrical wall having an arcuately-curved interior surface adapted to form a rolling track for a ball inserted into the hollow interior of said cylinder, the inside diameter of said cylinder being substantially greater than the diameter of said ball for preventing the build-up of compressed air which might otherwise slot the initial launch velocity of the ball once thrown, a ball-loading aperture formed in the top cylindrical wall of an intermediate cylindrical portion of said cylinder, a sensing aperture operatively disposed in said bottom cylindrical wall of said intermediate cylindrical portion for communicating with the hollow interior thereof, said sensing aperture being disposed a predetermined distance rearwardly of said loading aperture, said predetermined distance being sufficient to ensure that a ball passing downwardly through said loading aperture and dropping onto said rolling track has stopped bouncing and settled into a smooth rolling motion before passing over said sensing aperture, the rear end portion of said hollow interior of said cylinder including a portion of said rolling track adjacent said rear end closure means for defining a ball-launching position, and a thrust aperture operatively disposed in said rear end closure means along the vertical center line thereof and spaced a predetermined distance below a horizontal center line so as to be longitudinally aligned with the center of gravity of said loaded ball when said ball is in said ball-launching position;

means for positioning said cylinder such that said open mouth is elevated higher than the rear end portion and said longitudinal axis forms an acute angle with a horizontal support plane through said rear end portion, said acute angle being slected to throw said ball on said airborne trajectory;

sensing means mounted on said cylinder and at least partially within said sensing aperture for detecting the passage of said downwardly rolling ball thereover for generating a command signal;

electrical delay means responsive to the generation of said command signal for generating a delayed command signal at a predetermined period of time later, the predetermined period of time being at least sufficient to ensure that said ball has reached the end of said hollow interior of said cylinder and settled to rest in said ball-launching position;

solenoid means includng an elongated, generally cylindrical solenoid coil having a hollow longitudinal interior and an elongated piston-like thrust member operatively mounted for reciprocal movement with said hollow interior of said solenoid coil, one end portion of said thrust member including a distal end having a ball-impacting surface thereon, said one end postion having a withdrawn rest position wherein said one end portion of said thrust member is pulled back rearwardly of said thrust aperture when said solenoid coil is de-energized, and then extended forward to a firing position whenever said one end portion of said thrust member extends at least a predetermined distance through said thrust aperture and into the hollow interior of the rear end portion of said cylinder for impacting said ball in said ball-launching position and propelling same upwardly through the hollow interior of said cylinder, out of said open mouth and along said airborne trajectory to be chased, fetched and returned again by said animal;

ball-collecting means including means for guiding a returned ball at least one of dropped and otherwise deposited therein to said loading aperture for reloading the hollow interior of said cylinder for the next throw;

an electrical source for energizing said solenoid coil;

electrical connector means operatively connecting said source to said solenoid coil; and electrical switching means operatively disposed in said connexction means, said electrical switching means having a normally-open switch position and a closed switch position, said electrical switching means switching from said normally-open position to said closed position in response to the generation of said delayed comand signal for energizing said solenoid coil and firing said thrust member from said rest position to said forward firing position for impacting said ball and throwing same from within the hollow interior of said cylinder.

56. The automatic ball-throwing system of claim 55 wherein said positioning means includes a first manually-operable means for selecting the elevation of said cylinder at the open mouth thereof and hence the height of the airborne trajectory of the thrown ball.

57. The automatic ball-throwing system of claim 56 wherein said positioning means further includes a second manually-operable means for selecting the azimuth of the longitudinal axis of the hollow interior of said cylinder and hence the direction in which the ball is thrown.

58. The automatic ball-throwing system of claim 55 wherein said ball-collecting means includes a ball return aperture at least one of communicating with and corresonding to said ball-loading aperture of said cylinder, a ball collection area dimensioned much greater than said ball return aperture, and surface means connecting said ball collection area to said ball return aperture for guiding a fetched and returned ball at least one of dropped and otherwise deposited within said ball collection area downwardly under the force of gravity alone and into and through said ball return aperture for loading said ball into the hollow interior of said cylinder.

59. The automatic ball-throwing system of claim 55 further including housing means for substantially enclosing at least said cylinder, said positioning means, and said sensing means, said electrical delay means, said solenoid means and said electrical switching means.

60. The automatic ball-throwing system of claim 59 wherein said housing means comprises:
a pair of elongated, similarly dimensioned, longitudinal, rectangular, opposite side panels whose planes are generally parallel to one another;
a generally rectangular rear panel;
a generally rectangular front panel having a ball-launching aperture operatively disposed therein for at least one of communicating with and being coterminous with said open mouth of said cylinder, the plane of said front panel being generally parallel to the plane of said rear panel and perpendicular to the planes of said side panels, said rear panel being similarly dimensioned to said front panel;

a generally rectangular bottom panel for supporting said positioning means, the plane of said bottom panel being generally perpendicular to the planes of said side panels, said front panel and said rear panel; and a top portion operatively closing said housing means for forming a box-like strucutre having a hollow interior, said top portion including said ball-collecting means.

61. The automatic ball-throwing system of claim 60 wherein said top portion of said housing means comprises:

a generally rectangular rim means formed by the vertical upper edge portion of said side panels, said front panel and said rear panel, said rim means bounding said ball-collection area for preventing the escape of a ball at least one of dropped and otherwise deposited therewithin;

a lower surface portion operatively disposed below said rim;

a ball return aperture operatively disposed centrally within said lower surface portion for at least one of communicating with and corresponding to said ball-loading aperture of said cylinder; and downwardly and inwardly sloping surface means operatively connecting said rim means and the borders of said lower surface for guiding a ball deposited within said collection area downwardly under the force of gravity alone and into and through said ball return aperture for feeding same into the hollow interior of said cylinder to be thrown again.

62. The automatic ball-throwing aperture of claim 61 wherein said ball return aperture is operatively disposed in the proximate center of said top portion and includes ball conduit means operatively connecting siad ball return aperture to said ball-loading aperture for supplying the ball from said ball return aperture to said ball-loading aperture and loading same into the hollow interior of said cylinder.

63. The automatic ball-throwing system of claim 55 wherein said sensing means comprises an electrical switch having an open switch state and a closed switch state, said switch including an elongated switch-operating element normally biased in a first position where it is operatively extended through said sensing aperture of said cylinder and into the hollow interior thereof above said rolling track for maintaining said electrical switch in said normally-open switch state, said elongated switch-operating element being responsive to contact with the ball rolling downwardly along said rolling track and over said elongated switch-operating element for shifting to a second position and activating said electrical switch to said closed switch state to generate said comman signal.

64. The automatic ball-throwing system of claim 5 wherein said electrical source includes a 110 VAC source, said electrical connector menas includes at least a first and second electrical connector for connecting said source to said solenoid coil, and wherein said electricla switching means includes a first and second relay-operated normally-open switch disposed in said first and second electrical connectors, respectively, and wherein said delay means includes a normally de-energizing relay coil responsive to said delay command signal for energizing to close said first and second normally-opened relay-operated switches and supply 110 VAC power for energizing said solenoid coil to fire said thrust member forward and launch said ball along said airborne trajectory.

65. A ball-launching apparatus for propelling a ball on an airborne path to be chased and fetched by a ball-fetching animal repeatedly for as long as the animal continues to return the fetched ball after each successive chase, said ball-launching apparatus comprising:

an elongated, generally cylindrical, ball-launching tube having a hollow interior, a launch opening at the distal front end of said tube, a closure member having an aperture therethrough operably disposed adjacent the rear end of said tube, and a loading aperture adjacent said front end of said tube;

means for positioning said tube for elevating said front opening substantially above the level of said rear closure member;

means for collecting a returned ball and feeding same through said loading aperture and into the hollow interior of said tube;

means for detecting the presence of the ball at a predetermined position as it rolls down the hollow interior of the tube and before it comes to rest adjacent said closure member; and electro-mechanical means operably disposed behind said rear closure member of said tube and being responsive to said detecting means and to a predetermined time delay sufficient to allow the ball to come to rest adjacent the rear end of said tube for launching said ball through said hollow interior, out said front opening, and along said airbonre path to once again be chased, fetched and returned by said ball-fetching animal.

66. A ball-launching system for a dog's ball comprising:

a ball-launching tube having a hollow interior, an open front end, and a rear end portion;

means for elevating said open front end of said tube a substantial distance above the level of said rear end portion for launching a ball on an airborne path to be chased, fetched and returned by a dog;

means for feeding a returned ball into the hollow interior of said tube;

means for detecting a ball loaded into the hollow interior of said tube as it rolls downwardly past a predetermined position and before it comes to rest at a firing position adjacent said rear end portion of said tube; and means operatively disposed exterior to said tube and at least partially behind said rear end portion of said tube and responsive to said detection means and to a predetermined time delay sufficient for said ball to come to rest in said firing position for launching same upwardly through the hollow interior of said tube, out of said open front end, and along said airborne path to again be chased, fetched and returned by said dog.

* * * * *